(12) United States Patent
Podowski

(10) Patent No.: US 6,671,876 B1
(45) Date of Patent: Dec. 30, 2003

(54) MONITORING OF SOFTWARE OPERATION FOR IMPROVING COMPUTER PROGRAM PERFORMANCE

(75) Inventor: Robert R. Podowski, Mundelein, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/429,510

(22) Filed: Oct. 28, 1999

(51) Int. Cl.$^7$ ................................................. G06F 9/45
(52) U.S. Cl. ...................... 717/130; 717/127; 717/131; 717/158
(58) Field of Search ............................... 717/130, 127, 717/131, 158

(56) References Cited

U.S. PATENT DOCUMENTS

| | | | | |
|---|---|---|---|---|
| 5,355,487 A | * | 10/1994 | Keller et al. | 717/127 |
| 5,539,907 A | * | 7/1996 | Srivastava et al. | 717/130 |
| 5,732,273 A | * | 3/1998 | Srivastava et al. | 717/128 |
| 5,774,724 A | * | 6/1998 | Heisch | 717/129 |
| 5,847,972 A | | 12/1998 | Eick et al. | 709/246 |
| 6,026,236 A | * | 2/2000 | Fortin et al. | 717/127 |
| 6,026,401 A | * | 2/2000 | Brealey et al. | 707/8 |
| 6,049,666 A | * | 4/2000 | Bennett et al. | 717/130 |
| 6,161,200 A | * | 12/2000 | Rees et al. | 714/38 |
| 6,212,491 B1 | * | 4/2001 | Bargh et al. | 703/14 |
| 6,349,394 B1 | * | 2/2002 | Brock et al. | 714/47 |
| 6,530,079 B1 | * | 3/2003 | Choi et al. | 717/158 |
| 2002/0157086 A1 | * | 10/2002 | Lewis et al. | 717/127 |

OTHER PUBLICATIONS

"Visualizing Performance Debugging" by Ted Kehr et al, in *Computer*, Oct. 1989, pp. 38 through 51.
"Graphical Analysis of Computer Log Files" by Stephen G. Eick, Michael C. Nelson and Jeffrey D. Schmidt, Dec. 19, 1992.
"ParaGraph: A Graphical Tuning Tool for Multiprocessor Systems" by Seiichi Aikawa, Mayumi Kamiko, Takashi Chikayama, in *Fujitsu Scientific & Technical Journal*, 29, 2 (*Jun. 1993*).

* cited by examiner

*Primary Examiner*—John Chavis

(57) ABSTRACT

The operation of software carrying out a computer program is monitored for determining which blocks of code are being run and which are inactive. Each block of code being monitored has a software probe inserted at the beginning of the block for detection and identification purposes. In one embodiment, the software probe inserted in the block of code is automatically increment by 1 to indicate that the block has been accessed. The extent of use, or activity, of each block of code is recorded and presented in graphic form on a video display. In a first mode of operation, the times at which a selected block of code is accessed within a given time period is displayed along a horizontal axis and the number of times of access at each time it occurs is represented along a vertical axis in bar graph form. In a second mode of operation, the various monitored blocks of code are displayed along a horizontal axis in a spaced manner and the number of times each of the individual blocks is accessed during operation of the computer program is presented in bar graph form vertically. By uncovering and eliminating unused blocks of software code, the operating efficiency of the computer program as well as that of the hardware under the control of the computer program can be improved.

17 Claims, 8 Drawing Sheets

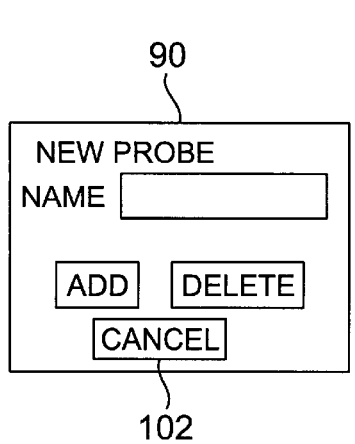
FIG. 9
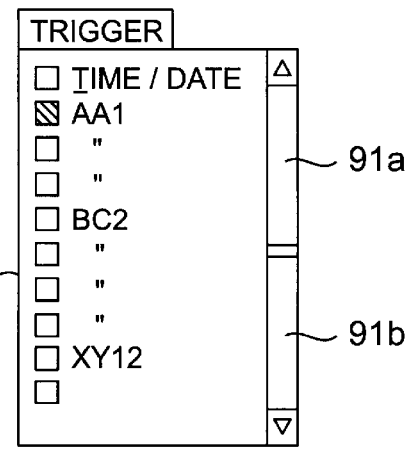
FIG. 10
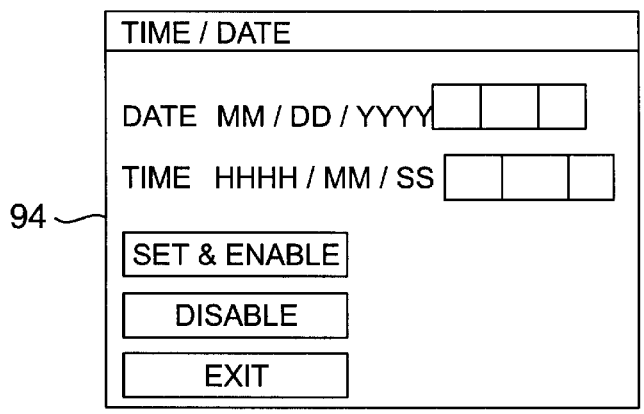
FIG. 11
FIG. 12
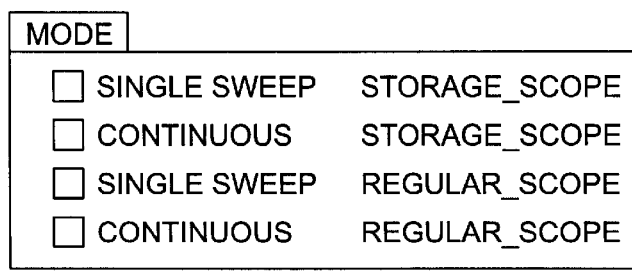

MONITORING OF SOFTWARE OPERATION FOR IMPROVING COMPUTER PROGRAM PERFORMANCE

FIELD OF THE INVENTION

This invention relates generally to the operation of computer programs and is particularly directed to the monitoring of the access, or use, of blocks of code during the operation of a computer program and the display in real time of this information.

BACKGROUND OF THE INVENTION

There are various aids for computer programmers in the design of a computer program. One programming aid makes use of log files which are reports on system performance, system status, and software faults. This approach provides for the graphic analysis of log files to analyze the occurrence of the log file and to possibly determine the cause of the report. An example of this after-the-fact analysis of computer program operation can be found in U.S. Pat. No. 5,847,972. Another programming aid is described in an article entitled "Visualizing Performance Debugging," by Ted Lehr et al. This approach makes use of the Parallel Programming and Instrumentation Environment (PIE) to develop performance-efficient parallel and sequential computations in a multi-processor system. The PIE system affords a visualization approach in computer program performance debugging. Finally, an article entitled "ParaGraph: A Graphical Tuning Tool for Multiprocessor Systems," published in the Fujitsu Scientific & Technical Journal, Vol. 29 (1993) Summer, No. 2, by Awikawa et al., describes a system that gathers periodical statistics of the computational and communication load of each processor in a multiprocessor arrangement during program execution. This data is collected in both the higher level of programming language and lower level of implementation, and is presented in a graphic form on a video display to allow a user to determine the best processor load distribution algorithm.

One problem of increasing importance in computer programming not addressed in the aforementioned programming aids is the size of the software product required to operate a system. As system complexities increase, the length and complexity of the program increases. Subsequent improvements to the program involve the writing of additional code. The tendency today is to write too much code without regard for the size of the software program. This tendency has been encouraged by the conventional wisdom that memory is cheap and programmers are expensive. This has led to large, unwieldy, software packages which run inefficiency and are cumbersome to modify or update. In addition, the operation of the device being controlled is also frequently limited by this approach. For example, the modified and expanded computer program becomes more cumbersome and slower to execute, typically resulting in an increased response time of the hardware carrying out the software-controlled operation. As the limits of computer storage capacity are approached, the computer components must be replaced with newer hardware.

The present invention addresses these problems encountered in the prior art by monitoring the running of selected blocks of software code and presenting this information in real time on a video display to allow for the determination of how frequently selected blocks of code are being accessed and conversely which blocks of code are not being accessed and can be deleted from the program.

SUMMARY OF THE INVENTION

This invention contemplates the monitoring of blocks of software code in a computer program to determine (1) how often a block of code is being run, (2) if a block of code is no longer being run, and (3) if new blocks are being run. This permits unused codes to be identified and deleted from the program thus allowing the program to run more efficiently and saving memory for other applications. This information is presented on a video display in two selectable formats in real time. In a first mode of operation, the times at which a selected block of code is accessed within a given time period is displayed along a horizontal axis and the number of times of access at each time it occurs is represented along a vertical axis in bar graph form. In a second mode of operation, the various monitored blocks of code are displayed along a horizontal axis in a spaced manner and the number of times each of the individual blocks is accessed as the computer program runs is presented in bar graph form vertically.

The invention is implemented in a manner similar to that of an oscilloscope with its voltage/current probes attached at various locations in the circuit under analysis. The present invention employs special lines of code added to each software module being observed which function as probes. There is a one-to-one relationship between the software probes and the blocks of code. Every time a given block of code is run, a counter is incremented. The contents of the various counters each corresponding to a block of code are processed and presented on the video display. The contents of the counters are reset as determined by the sweep parameters and the stop and start selectors. Parameter settings such as horizontal sweep, event triggering, and vertical scale are examined first, and are then combined with the data recorded for determining how the data is to be displayed. The display is operated in a manner typical of a Microsoft Windows® application.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIGS. 7–12 show various presentations provided on a video display which permit a user to enter various selected inputs in monitoring and displaying the software operation of a computer program in accordance with the present invention.

DETAILED DESCRIPTION OF THE PREFERRED EMBODIMENT

The present invention operates in a manner somewhat similar to the operation of an oscilloscope in the analysis of the operation of hardware. The purpose of the present invention is to provide a means of observing, in real time, the running of selected blocks of software code in a computer program. More specifically, the action of entering a selected block of code is recorded on a counter associated with that block. Data on selected blocks of code is collected over time, processed, and then presented on a video display similar to the electrical data displayed on a hardware oscilloscope.

Figure 1:
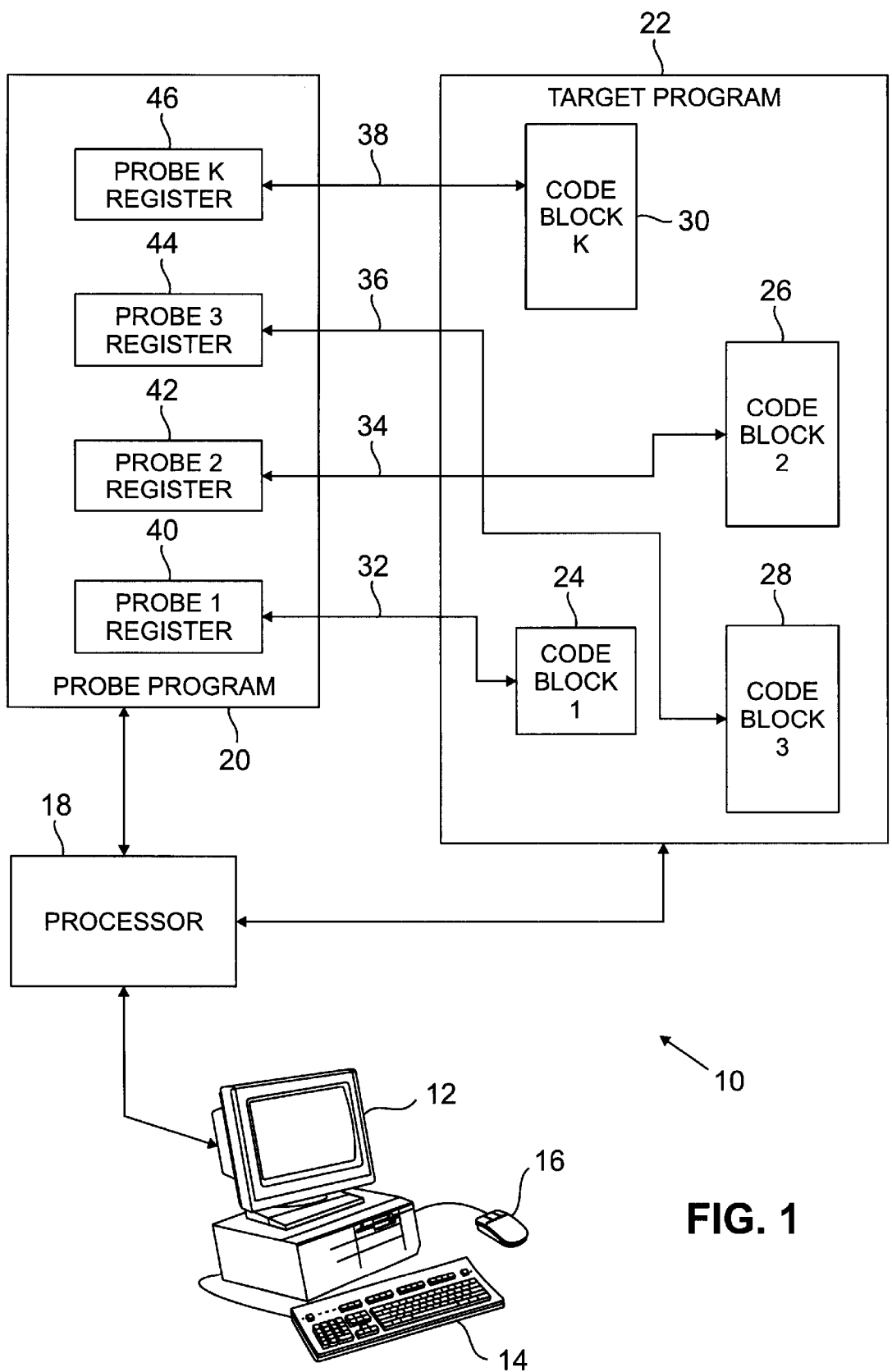
FIG. 1 is a simplified combined schematic and block diagram of a software monitoring system in accordance with the principles of the present invention.

Referring to FIG. 1, there is shown a simplified combined block and schematic diagram of a software monitoring system 10 in accordance with the present invention. The software monitoring system 1 0 includes a computer terminal 12 with a keyboard 14 and a mouse control 16. The computer terminal 12 is connected to a processor 18 which runs a target program 22. It is the target program 22 which the present invention monitors and analyzes in real time, with the results of this analysis presented on the video display of the computer terminal 12. In accordance with the present invention, processor 18 also runs a probe program 20 which operates in conjunction with the target program 22 as described in detail below. While the processor 18 is shown coupled to the probe program 20 and target program 22, in actual practice the probe program and the target program are stored within the processor and operate under the control of the processor.

Target program 22 is shown as including various blocks of code such as first, second and third code blocks 24, 26 and 28 as well as a Kth code block 30. While only four blocks of code are shown in the target program 22 in FIG. 1, the present invention is capable of analyzing virtually any number of blocks of code, thus the designation of the Kth code block as element 30. Each block of code carries out a specific task or a series of tasks and together the blocks of code form the operating program which is being analyzed. The probe program 20 includes first, second and third probe registers 40, 42 and 44, as well as a Kth probe register 46. Software probes connect each probe register in the probe program 20 to an associated block of software code in the target program 22. Thus, first, second and third software probes 32, 34 and 36 respectively couple the first probe register 40 to the first code block 24, the second probe register 42 to the second code block 26, and the third probe register 44 to the third code block 28. Similarly, a Kth software probe connects the Kth probe register 46 to the Kth code block 30.

Figure 6A:
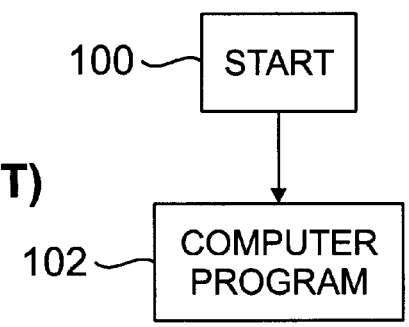
FIGS. 6a, 6b and 6c are simplified flow charts showing the difference between prior art computer programs and a computer program for monitoring software operation in accordance with the present invention.
Figure 6B:
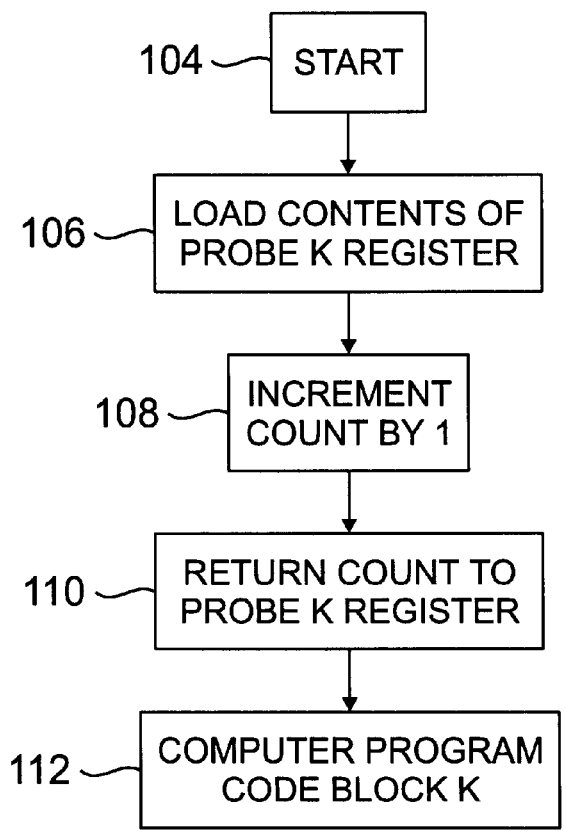
Figure 6C:
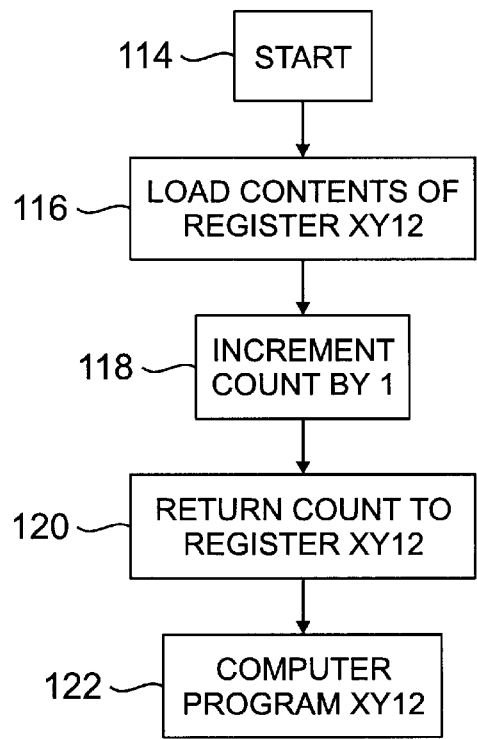
Figure 7:
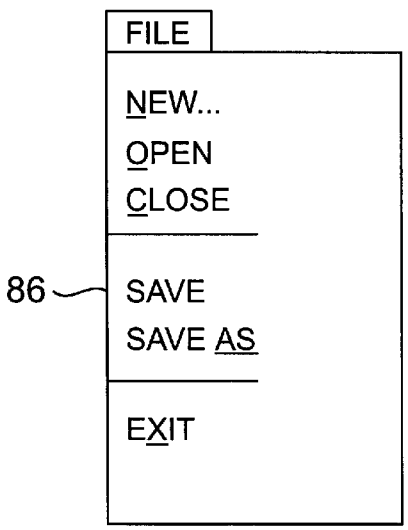

Referring to FIGS. 6a, 6b and 6c, there is shown a comparison of prior art approaches with the present invention. Each of FIGS. 6a, 6b and 6c is a simplified flow chart indicating the start and operation of a computer program. Thus, as shown in FIG. 6a, prior art approaches initiated the start of the operation of a computer program at step 100, followed by the carrying out of the steps of the computer program at step 102. In accordance with the present invention, as shown in FIG. 6b, the computer program is started at step 104, followed by loading of the contents of a probe register in the probe program 20 in the block of code associated with that register at step 106. Thus, for the case of a register designated as K, the contents of this register is loaded at step 106 into its associated block of code in the target program 22. Each time the block of code K is accessed by the computer program, a counter is incremented at step 108. The new count is then provided from the block of code K in the target program 22 to the associated probe register in the probe program at step 110. The program then continues to operate in either accessing or not accessing the block of code containing the K software probe at step 112. FIG. 6c is similar to FIG. 6b except that in FIG. 6c the contents of register XY12 is loaded from a probe register in the probe program 20 into an associated block of code in the target program 22. Thus, operation of the computer program is initiated at step 114, followed by loading of the contents of the XY12 register into an associated block of code in the target program 22 at step 116. Each time the block of code containing the XY12 software probe is accessed, a counter is incremented by 1 at step 112 and the new count is provided to the XY12 register in the probe program 20 at step 120. The program continues to operate at step 122, continuously monitoring for access of the block of code containing the XY12 software probe. In summary, each block of code in the target program 22 has an associated probe register in the probe program 20 which are connected by means of a respective software probe. Every time a block of code is run in the target program 22, its corresponding register in the probe program 20 is incremented by 1. This is the only operational connection of the probe program 20 with the target program 22. Thus, the impact of the probe program 20 on the target program 22 is minimized because all manipulation of probe data is performed at the probe register in the probe program and is not performed in the target program 22.

Figure 2:
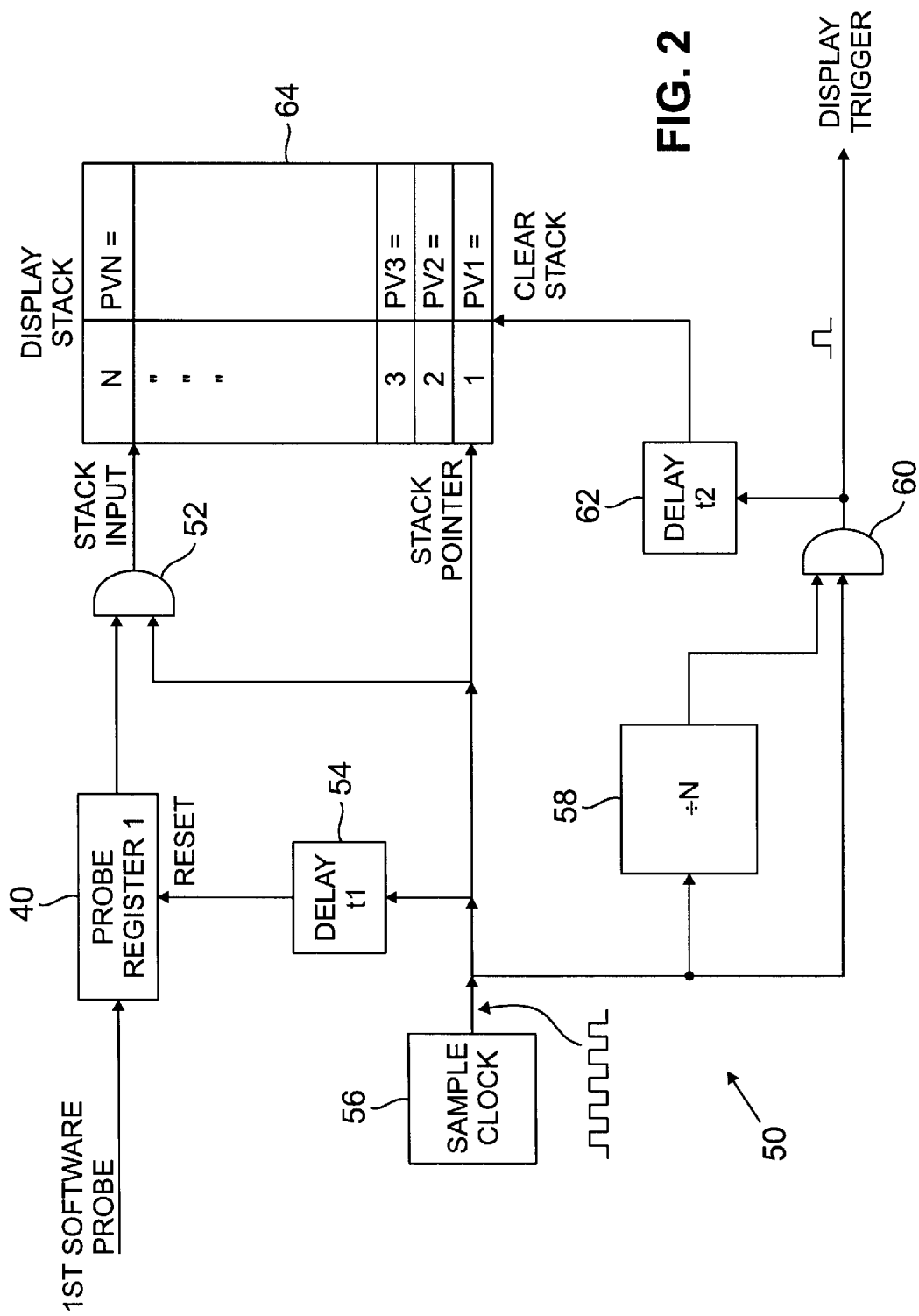
FIG. 2 is a combined block and schematic diagram of control circuitry implemented by software in the monitoring of software operation in a computer program in a first display mode of operation of the present invention.
Figure 3:
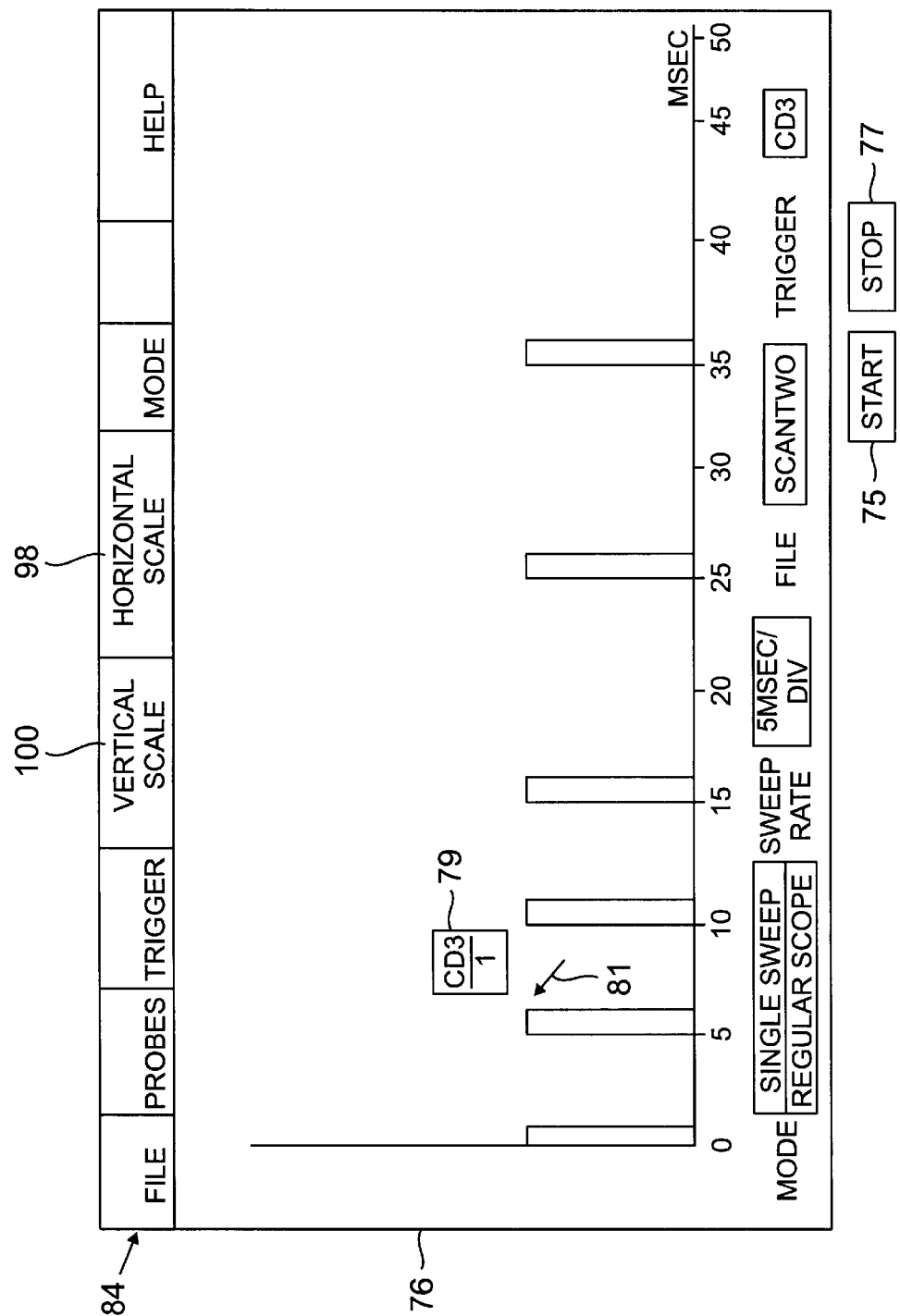
FIG. 3 illustrates a typical presentation of information on a video display as provided by the present invention when operated in the first display mode of operation.

Referring to FIG. 2, there is shown a combined block and schematic diagram of a software probe sample circuit 50 for use in a first, regular mode of operation. FIG. 2 represents the series of steps involved in recording and displaying data in accordance with this aspect of the present invention. While shown in terms of logic components in the figure, this series of steps is actually performed by the operating program stored in the processor 18 of FIG. 1. In addition, while the following description is in terms of the first software probe, it is equally as well applicable to any of the software probes. FIG. 3 illustrates a typical presentation of information on a video display 76 as provided by the present invention when operated in the first, regular display mode of operation. In the figures, the same element shown in the various figures is assigned the same reference character throughout the figures.

A software probe is loaded into the first probe register 40. The probe register 40 is incremented each time its associated block of code in the target program is accessed, or run. FIG. 2 shows how this data is cleared and collection restarted as well as how these operations are synchronized with the display of data. A timing source such as a sample clock 56 provides timing for the software monitoring system. If, for example, the sample clock 56 is running at a rate of one pulse every one microsecond as shown by the pulse diagram output from the sample clock, the value of the probe register 40 is loaded into a display stack 64 every microsecond. The value of the probe register 40 is gated by AND gate 52 which also receives the pulsed, timed output of the sample clock 56. A time delay of t1 is introduced into the clock signal provided by the sample clock 56 to the first probe register 40 by means of a delay circuit 54. This time delayed input to the first probe register 40 provides for resetting of the probe register. A display stack pointer for the display stack 64 is incremented every clock pulse output by the sample clock 56. As a result, the display stack 64 contains values taken by the first probe register 40 in an ordered array with respect to time. For example, the first sample is PV1, but while the last sample is PVN. The pulsed output of the sample clock 56 is also provided to a second AND gate 60 as well as to a ÷N circuit 58. The divided down output of the ÷N circuit 58 is provided to the other input of AND gate 60 and the pulsed output of the AND gate is provided to a display trigger as well as to a second t2 delay circuit 62. In the present example, N is equal to 500. The output of the second t2 delay circuit 62 is provided to the display stack 64 for clearing the contents of the display stack to 0 after the second time delay. As samples from the first register probe 40 are read into the display stack 64 after a time delay of t1, the probe register is reset to zero by the output of the time delay circuit 54. After N periods of the system clock, the display stack 64 contains a history of the number of times the first block of code has been run, or accessed, within the last, in the present example, 0.5 milliseconds. The display trigger pulses output by the second AND gate 60 are provided to a video display for synchronizing these operations with the display of data.

FIG. 3 shows the presentation of the regular display mode of operation in the present invention. In the example shown, the software probe is connected to a block of code designated as CD3. The display mode of operation selected is single sweep. The display 76 shows six occurrences of the CD3 block of code being run within a period of 50 milliseconds. The display sweep time is started the first time the CD3 block of code is accessed. This mode of operation is particularly adapted for viewing the number of times a particular block of code is run relative to a selected time base. If the CD3 block of code is accessed more than once within a given 5 millisecond period, this would be shown by an increased length in the vertical direction of the bar graph element for that particular time period within the 50 millisecond scan period.

Figure 4:
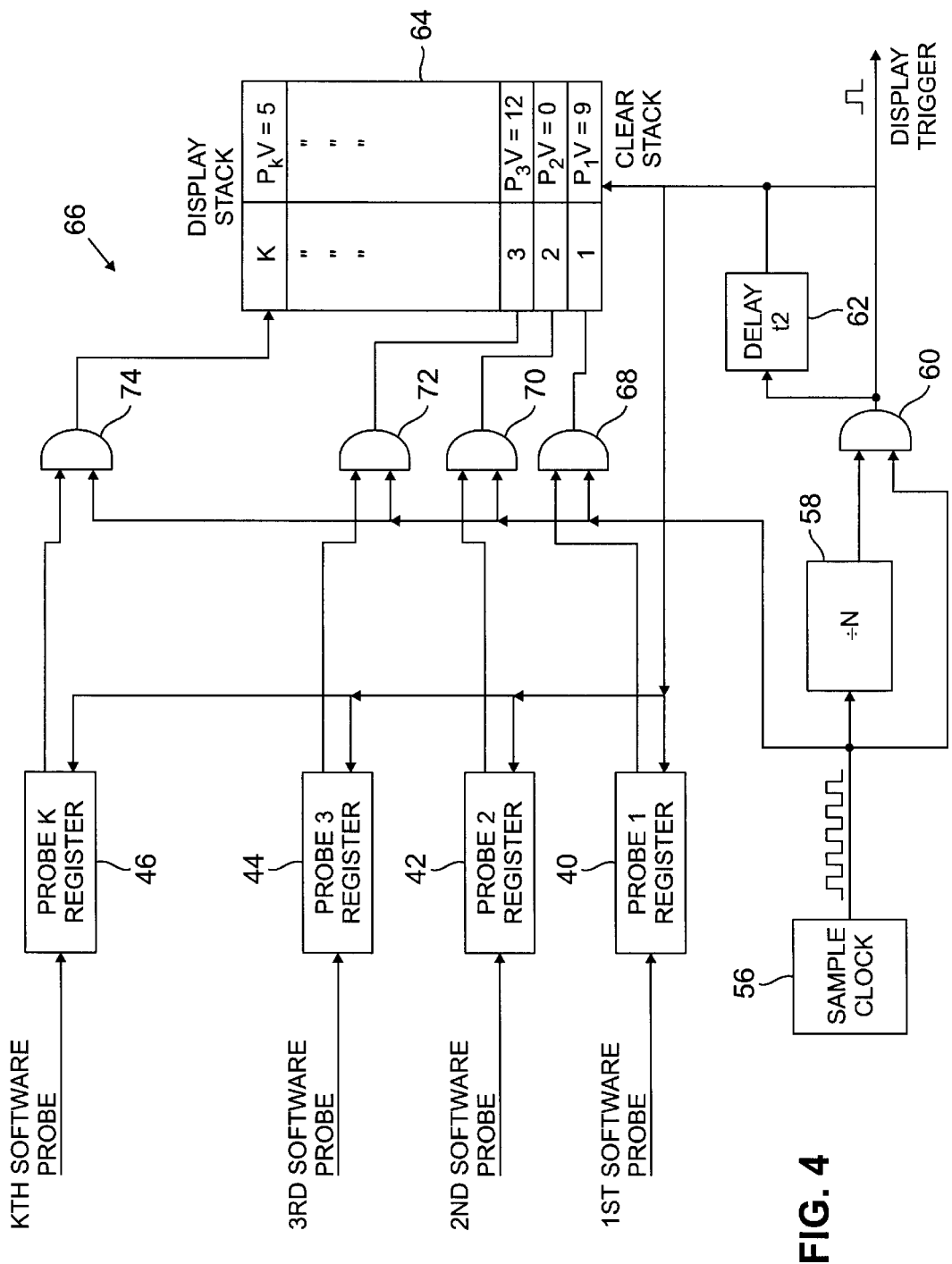
FIG. 4 is a combined block and schematic diagram of control circuitry implemented by software in the monitoring of software operation in a computer program in a second display mode of operation of the present invention.
Figure 5:
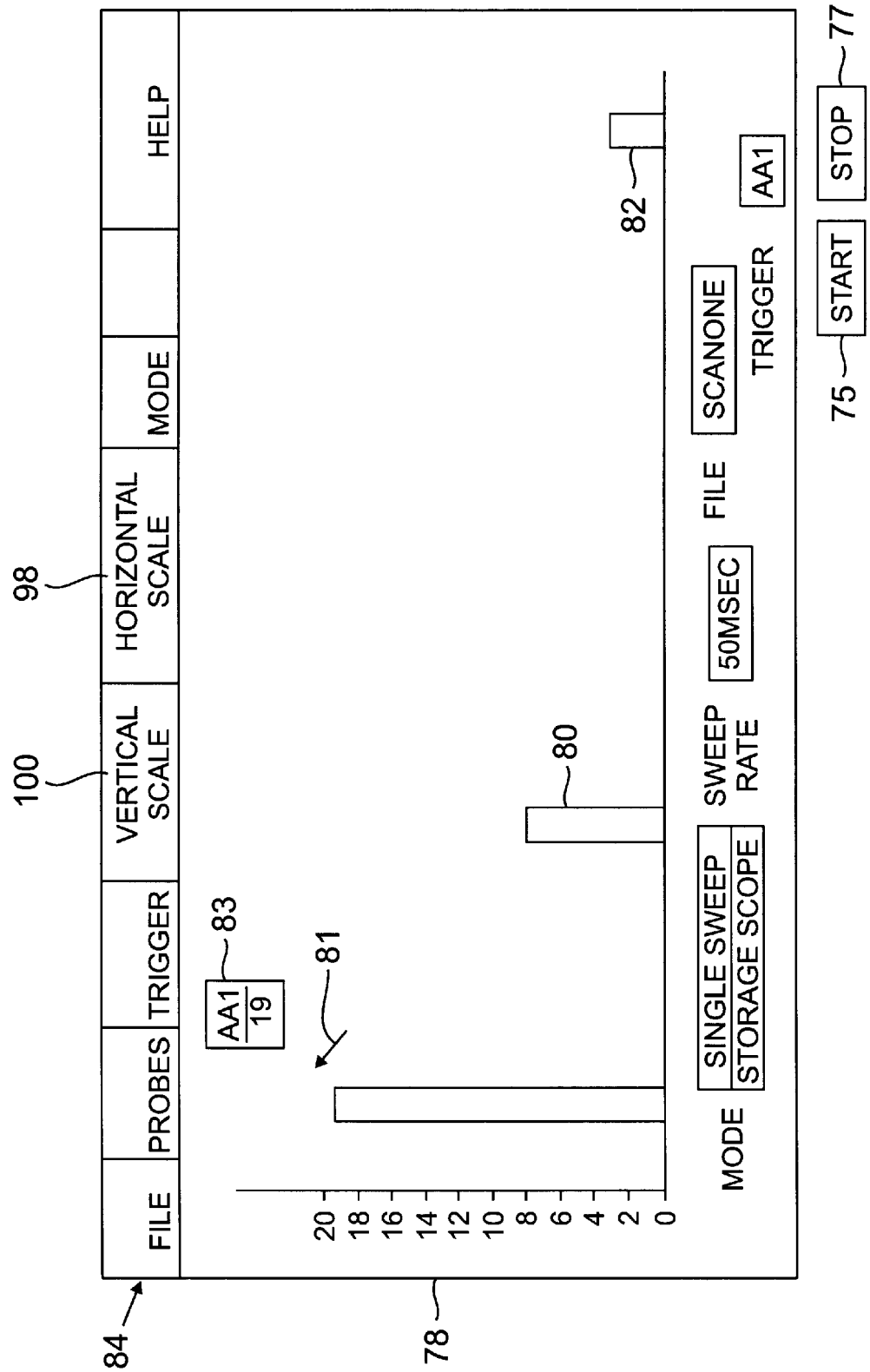
FIG. 5 shows a typical presentation of information on a video display as provided by the present invention when operated in the second display mode of operation.

Referring to FIG. 4, there is shown a combined block and schematic diagram of a software probe sample circuit 66 for use in a second, storage display mode of operation in accordance with another aspect of the present invention. Again, FIG. 4 shows the manner in which data is recorded and displayed in terms of hardware logic, although in the preferred embodiment of the present invention these steps are carried out in the operating program stored in the processor of FIG. 1. FIG. 5 shows a typical presentation of information on a video display 78 as provided by the present invention when operated in the second, storage display mode of operation. The software probe sample circuit 66 for the storage mode of operation includes the aforementioned first, second, third and Kth registers 40, 42, 44 and 46 which respectively receive the first, second, third and Kth software probes. In addition to the previously described second AND gate 60, the software probe sample circuit 66 for the storage mode of operation includes third, fourth, fifth and sixth AND gates 68, 70, 72 and 74. In the storage mode of operation, virtually any number of probe registers may be incorporated in the software probe sample circuit 66 and their data stored in the display stack 64. The counts in the display stack 64 are allowed to accumulate for the entire sweep period. Counting N pulses of the sample clock 56 again defines the sweep period. In the example shown in FIGS. 4 and 5, the sweep period is 0.5 milliseconds. A combination of the sample clock 56, a ÷N circuit 58, the second AND gate 60 and the t2 delay circuit 62 operate as previously described with respect to the software probe sample circuit 50 for the regular mode of operation in clearing the display stack 64 and clocking a detected software probe associated with a given probe register into the display stack. In the present example, the K probe register 46 is incremented every time block of code K is run in the target program. The display stack register 64 continues to increment the detected counts for the entire sweep period of 0.5 milliseconds. This is shown symbolically by AND gate 74. Also as shown in the example of FIG. 5, three blocks of code have been run by the target program. The display shows a block of code identified as AA1 as run 19 times within a 50 millisecond period. Another block of code identified as element 80 was run eight times within the same 50 millisecond period. A third block of code identified as element 82 was run four times within the same 50 millisecond sweep time. The mode select switch is in the single sweep mode providing only a single scan of 50 milliseconds. The data collected is stored in a file called SCAN ONE. The trigger source is the AA1 block of code, where the 50 millisecond sweep starts on the first entry into the AA1 block of code. Thus, in the present example, the AA1 block of code was run an additional 18 times within the 50 millisecond period after the initial running of this block of code. The video display stays up until the next time the start button 75 is selected by moving the mouse pointer over the start button and clicking the mouse pointer. The various functions and parameter settings are accessible along the top of the display on the toolbar 84 as in a conventional Microsoft Windows® application. Each item in the toolbar 84 has a pull-down menu as described in detail below. The mouse pointer is positioned over the item and the mouse button is clicked to cause the desired pull-down menu to appear.

In FIGS. 3 and 5, arrow 81 shown on the video display represents the mouse pointer. When the arrow 81 associated with the mouse pointer is placed next to or adjacent a vertical bar, a pop-up window appears. In FIG. 3, the mouse pointer represented by arrow 81 indicates in pop-up window 79 that block of code CD3 has been accessed once. Similarly, the mouse pointer represented by arrow 81 in FIG. 5 indicates in pop-up window 83 that block of code AA1 has been accessed 19 times within the 50 millisecond time period.

FIGS. 7–12 show various presentations provided on a video display which permit a user to enter various selected inputs in monitoring and displaying the software operation of a computer program in accordance with the present invention. The file pull-down menu is shown in the display 86 of FIG. 7. The file pull-down menu allows a user the ability to open a new file, open a previous file, or close the current file. The current file can also be saved with its current file name, or saved under a new file name. Selection of the exit command ends the software monitoring session and exits the software analysis program.

Figure 8:
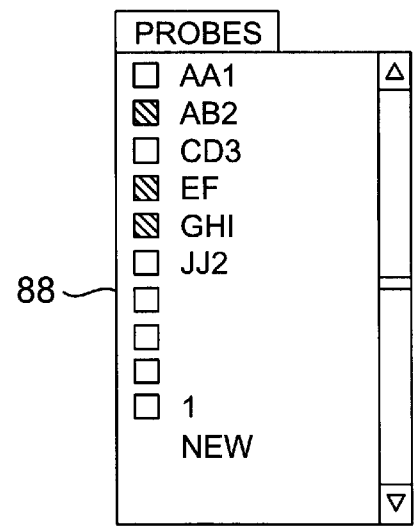

Connecting the software probes to their respective blocks of software code is accomplished by bringing up the PROBE's pull-down menu shown in the display 88 of FIG. 8. In this context, "connection" is taken to mean that data from a probe register is read into its associated block of code. If a software probe is disconnected, data from a probe register is not read into the display stack. The intent of this design is to minimize the impact on the target program of the software probes that have been inserted in the target program. The item names listed in alpha-numeric character form are the names of the software blocks that have special lines of code added to them as previously described in accordance with the present invention. Using display 88, each of the blocks of code to be observed is connected to an associated probe register by means of a software probe by clicking inside a selected check box shown in the display. Alternate clicking of the mouse on a given check box results in connecting and disconnecting the software probe from its associated block of code. In this example, probes AB2, EF and GH1 are asserted. Virtually any number of blocks of code can be selected and assigned an associated software probe using display 88. The list of blocks of code selected is generated by reading the contents from a file of software probes. Software probes can be added to or deleted from the software monitoring operation of the present invention by means of display 90 shown in FIG. 9. The identity of the selected probe is entered in the "name" location and either the ADD, DELETE or CANCEL command is selected by the user.

In both the regular and storage display modes of operation, SINGLE SWEEP is selected on the display for a single pass of data collection. Data collection stops when the sweep time setting times out. For example, if 50 milliseconds is selected, after 50 milliseconds, data collection stops. While the software probes are always collecting data, data from the corresponding registers is not read. In the continuous mode of operation for both the regular and storage display modes, data collection from the corresponding probe registers continues until the STOP selector 77 is clicked by means of the mouse control. The data collected over the 50 millisecond period is then displayed. In the regular display mode of operation, after 50 milliseconds the data, i.e., the software probe counters, is (are) cleared. A new 50 millisecond period of data collection is initiated and this data is then presented on the video display. The display of this updated data continues until the STOP selector 77 is clicked by the mouse pointer. In the storage display mode of operation, data is collected for 50 milliseconds. At the end of this 50 millisecond period, the data i.e., the software probe counters, is (are) not cleared. The display 78 as shown in FIG. 5 in this case presents cumulative data, with the number of times a given block of code was accessed now displayed as a histogram. A bar-like vertical image for a given block of code continues to increase in length along the vertical direction each time the associated block of code is accessed. The storage display mode of operation thus permits viewing the accessing of several different blocks of code and their relative frequency of running. An important feature of this invention is that the software probes connected to the target program are always ON, resulting in the least impact on the operation of the target program.

Operating parameters, including those controlling the video display, can be changed only when the software monitoring system is in the STOP mode. Moving the mouse pointer to a position over the STOP selector 77 causes the software monitoring system to stop operating. In this state, operating parameters such as those that control the display of information on the video display can now be changed. For example, the horizontal sweep rate of the display can be changed by selecting a value from the pull-down list that appears under Horizontal Scale 98 as shown in FIGS. 3 and 5. Moving the mouse pointer to the horizontal scale selector 98 as shown in FIG. 3 and clicking the mouse button causes a horizontal scale list to appear. Moving the mouse pointer to the box next to the 50 millisecond/scan and then clicking the mouse button causes a check mark to appear in that box. In a similar manner, the trigger source may be selected from the pull-down menu shown in the display 92 of FIG. 10. In the present example, the software block designated as AA1 is the selected trigger. This means that the data will be displayed from left to right on the video display, with the AA1 software probe as the leftmost entry. The order is determined by the order that appears in the Probe's window shown in the display 88 of FIG. 8. The sampling period in the present example is 50 milliseconds. In the example previously described and shown in FIG. 5, the AA1 software block was accessed 19 times within the 50 millisecond period. Scroll bars 91*a* and 91*b* in display 92 of FIG. 10 allow for the designation of additional software probes beyond those listed in the figure. The vertical scale of the video display can be changed by selecting a value from the list in the pull-down list under the vertical scale selector 100 as shown in FIGS. 3 and 5. One of the selections available is designated AUTO. This selection provides an AUTO-scaling feature. After all of the data has been collected, but before it is displayed, a scan of all the data determines the highest value. A vertical scale that will best fit the highest value in the group of recorded data is then automatically selected. For example, if the highest value detected is 19 for the AA1 block of code, then a vertical scale of two events/division on the video display for a total of 20 would automatically be selected. The software modules to be monitored are selected by means of the pull-down menu that appears under Probes as shown in the display 88 of FIG. 8. The software probe names come from the list generated. The cancel selector 102 shown on the display 90 in FIG. 9 is used to stop any further action in that window and return to the probe's pull-down menu shown in the display 88 of FIG. 8.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawing is offered by way of illustration only and not as a limitation. The actual scope of the invention is intended to be defined in the following claims when viewed in their proper perspective based on the prior art.

I claim:

1. A method for analyzing the operation of a computer program wherein a plurality of blocks of software code are sequentially accessed during operation of the computer program, said method comprising the steps of:

inserting a probe entry in a block of code, wherein said probe entry uniquely identifies said block of code;

operating the computer program;

detecting the occurrence of said probe entry corresponding to accessing of said block of code by the computer program;

counting the number of occurrences of said probe entry in a selected time period corresponding to the number of times said block of code is accessed by the computer program in said selected time period; and presenting during said selected time period the number of occurrences of said probe entry on a video display;

wherein said probe entry comprises incrementing a counter in said block of code each time said probe entry occurs, and wherein the occurrences of said probe entry are presented at designated time intervals within said selected time period.

2. The method of claim 1 wherein the step of inserting a probe entry includes locating said probe entry at a start of said block of code.

3. The method of claim 1 wherein the occurrences of said probe entry at designated time intervals within said selected time period is presented in a spaced manner along a first axis on the video display and each occurrence is represented along a second axis, and wherein said first and second axes are orthogonal.

4. The method of claim 3 wherein the number of occurrences at each of said designated time intervals is presented as a bar graph along said second axis.

5. The method of claim 4 further comprising the step of presenting indicia for an occurrence of a probe entry represented by a given bar graph.

6. The method of claim 5 wherein said indicia for the occurrence of a probe entry includes the identity of said probe entry and the number of occurrences of said probe entry within said selected time period, and wherein the identity and the number of occurrences of said probe entry are presented in a pop-up window on said video display.

7. The method of claim 1 further comprising the step of changing the length of said selected time period.

8. The method of claim 1 further comprising the steps of:
inserting a probe entry in each of plural blocks of code, wherein each probe entry uniquely identifies each block of code;
detecting and counting the number of occurrences of each probe entry in said selected time period; and
presenting the number of occurrences of each of said probe entries representing access by the computer program of plural blocks of code on a video display.

9. The method of claim 8 further comprising the step of repeating said selected time period for detecting, counting and presenting on said video display the number of occurrences of each probe entry over an extended period of time.

10. A method for analyzing the operation of a computer program wherein a plurality of blocks of software code are sequentially accessed during operation of the computer program, said method comprising the steps of:
inserting a probe entry in a block of code, wherein said probe entry uniquely identifies said block of code;
operating the computer program;
detecting the occurrence of said probe entry corresponding to accessing of said block of code by the computer program;
counting the number of occurrences of said probe entry in a selected time period corresponding to the number of times said block of code is accessed by the computer program in said selected time period;
presenting during said selected time period the number of occurrences of said probe entry on a video display; and
automatically adjusting the display of the number of occurrences of said probe entry in accordance with a maximum number of detected occurrences, wherein said maximum number of occurrences extends substantially over the entire video display.

11. A method for analyzing operation of a computer program by determining which of plural blocks code are accessed during operation of the computer program, said method comprising the steps of:
inserting a probe entry in selected ones of said plural blocks of code, wherein each probe entry uniquely identifies an associated block of code in which the probe entry is inserted;
operating the computer program and accessing various of the blocks of code;
detecting the occurrence of various of said probe entries wherein each occurrence of a probe entry corresponds to an access of a corresponding block of code;
counting the number of occurrences of each probe entry in a selected time period corresponding to the accessing of associated blocks of code by the computer program;
presenting in real time the number of occurrences of each probe entry within said selected time period on a video display; and
presenting on the video display the occurrence of each probe entry in a spaced manner along a first axis and the number of each occurrence of each probe entry along a second axis, wherein said first and second axes are orthogonal.

12. The method of claim 11 wherein the occurrences of said probe entries are presented as a plurality of spaced bar graphs, and wherein a length of each bar graph represents the number of occurrences of an associated probe entry.

13. The method of claim 12 further comprising the step of changing the number of probe entries inserted in blocks of code in the computer program.

14. Apparatus for monitoring a computer program in real time, wherein plural blocks of code in said computer program are sequentially accessed during operation of said computer program, said apparatus comprising:
means for inserting a probe entry in a block of code, wherein said probe entry uniquely identifies said block of code and said means for inserting said probe entry includes a probe program coupled to said computer program;
a detector for detecting the occurrence of said probe entry, wherein the occurrence of said probe entry corresponds to running of said block of code by the computer program;
a counter coupled to said detector for counting the number of occurrences of said probe entry within a given time period corresponding to the number of times said block of code is run by the computer program in said given time period, wherein said counter includes a software register in said probe program; and
a video display coupled to said counter for presenting a video image of the number of times said block of code is run by the computer program in said given time period;
wherein the video display presents a video image of when said block of code is run at designated time intervals within said given time period in a spaced manner along a first axis and each running of said block of code is shown along a second axis, and wherein said first and second axes are orthogonal.

15. The apparatus of claim 14 wherein the number of times said block of code is run at each designated time interval within said given time period is presented as a bar graph along said second axis.

16. The apparatus of claim 15 further comprising means for changing the duration of said given time period.

17. The apparatus of claim 14 further comprising means for inserting a respective probe entry in each of plural blocks of code, wherein each probe entry uniquely identifies its associated block of code, and wherein said detector and said counter detect and count the number of occurrences of each of said probe entries corresponding to the number of times each of said blocks of code is run by the computer program, and wherein said video display presents a video image of the number of times each of said respective blocks of code is run by the computer program in said given time period.

* * * * *